May 15, 1956

R. W. JENSEN 2,745,431

SPRING RATE COMPENSATING DEVICE
FOR RELIEF VALVES AND ACTUATORS

Filed June 9, 1953

RAYMOND W. JENSEN
INVENTOR.

BY John H. Wallace

May 15, 1956  R. W. JENSEN  2,745,431
SPRING RATE COMPENSATING DEVICE
FOR RELIEF VALVES AND ACTUATORS
Filed June 9, 1953   3 Sheets-Sheet 2
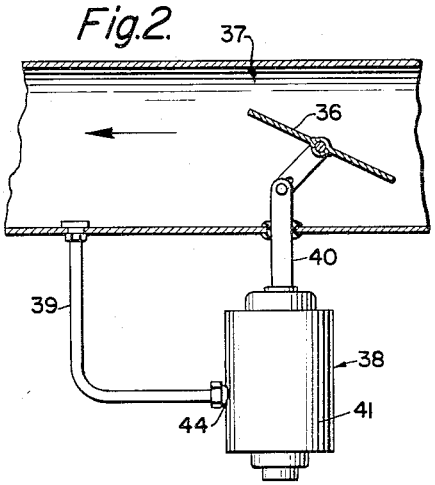
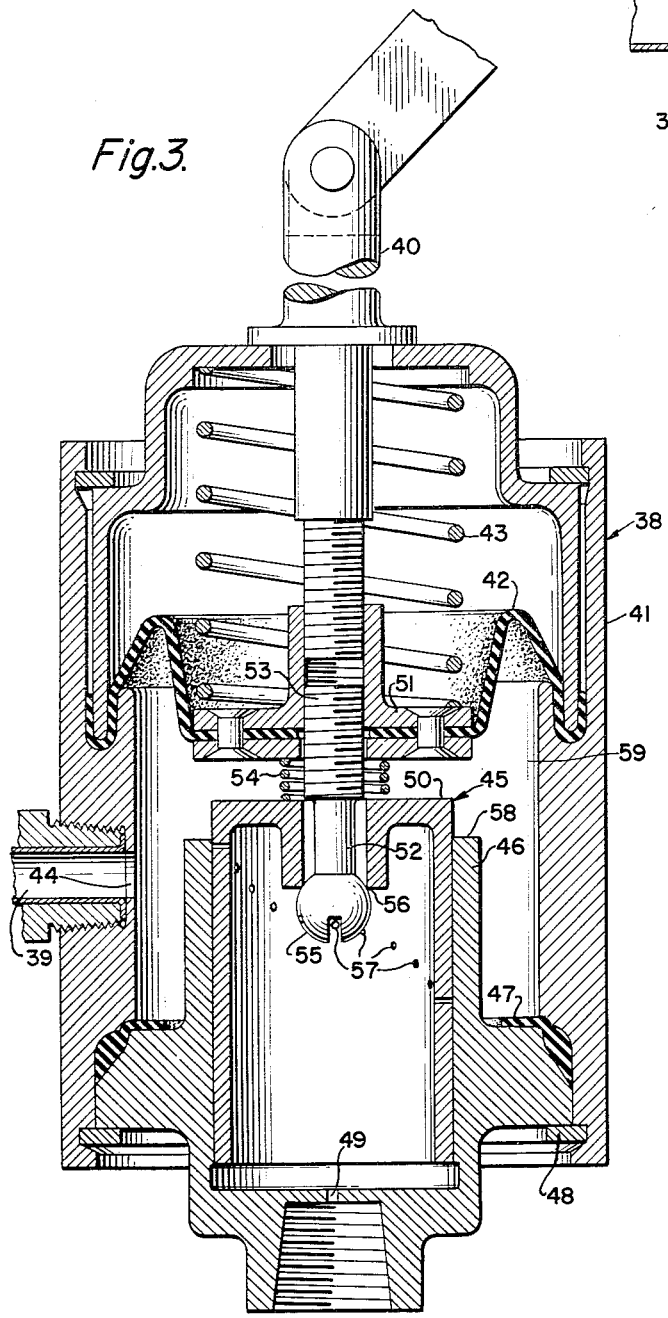
RAYMOND W. JENSEN,
INVENTOR.
BY John H. J. Wallace May 15, 1956 R. W. JENSEN 2,745,431
SPRING RATE COMPENSATING DEVICE
FOR RELIEF VALVES AND ACTUATORS
Filed June 9, 1953 3 Sheets-Sheet 3

RAYMOND W. JENSEN,
INVENTOR.

BY John H.J. Wallace

United States Patent Office 2,745,431
Patented May 15, 1956

2,745,431

SPRING RATE COMPENSATING DEVICE FOR RELIEF VALVES AND ACTUATORS

Raymond W. Jensen, Encino, Calif., assignor to The Garrett Corporation, Los Angeles, Calif., a corporation of California Application June 9, 1953, Serial No. 360,563

11 Claims. (Cl. 137—514.7)

This invention relates to a spring rate compensating device for relief valves and actuators and more particularly to a fluid pressure operated device which compensates for the progressively increasing force of a spring during deflection thereof.

It is an object of this invention to provide a pressure-operated valve wherein the pressure of a fluid flowing therethrough may be near or even below the pressure required to open the valve.

It is another object of this invention to provide a pressure-operated relief valve capable of conveying a volume flow of fluid at a relatively low pressure.

A further object of the invention is to provide a relief valve adapted to accommodate variations in air flow requiring great amplitude of valve-member movement.

Another object of this invention is to provide a pneumatically operated actuator employing resilient means tending to resist movement of the actuator, and wherein a pneumatic fluid chamber means is progressively vented during movement of the actuator to concurrently compensate for the increasing force of the resilient means.

Still another object of the invention is to provide a spring rate compensating device, for relief valves, actuators or the like, which greatly reduces the hunting tendency of pneumatically operated adjusting mechanisms included therein or connected therewith.

A further object of the invention is to provide a relief valve having a low rate of flow therethrough, in proportion to the pressure required to open the valve.

A still further object of this invention is to provide a very simple, compact relief valve which operates very efficiently in relieving a relatively large volume of fluid, at low pressures, during a given time period.

Further objects and advantages will appear from the following specification and appended claims.

Fig. 1 of the drawings is an axial sectional view of a relief valve of the invention showing by broken lines an open position thereof;

Fig. 2 is a diagrammatic illustration of a modification of the invention embodied in an actuator for a valve;

Fig. 3 is an enlarged axial sectional view of the valve actuator shown in Fig. 2;

Figure 1:
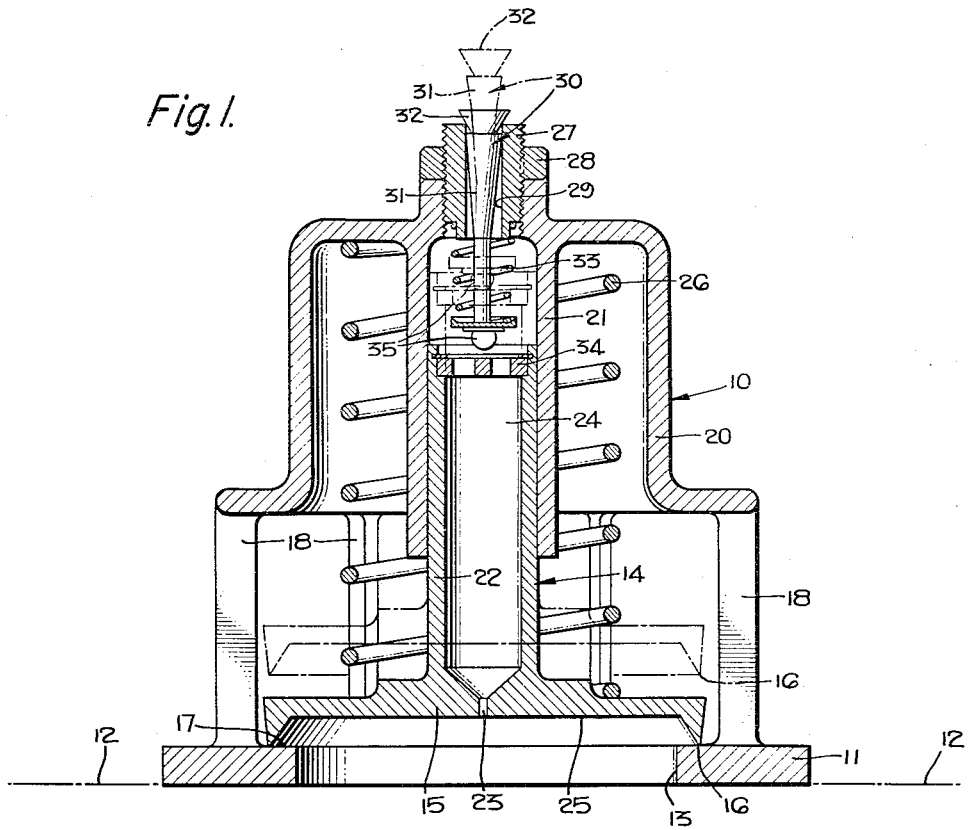

The relief valve shown in Fig. 1 of the drawings is provided with a frame 10 having a mounting flange 11. This mounting flange is securable to a bulkhead or other structure as shown by broken lines 12. Centrally of the mounting flange is a vent opening 13 communicating with the head 15 of a poppet valve 14. The poppet valve is provided with an annular edge 16, engageable with the seat 17 of the flange 11. The frame is provided with spaced legs 18 fixed on the mounting flange 11. These spaced legs support the frame casing 20 which is provided with a concentric cylinder 21. The hollow chambered stem 22 of the poppet valve 14 is reciprocally mounted in the cylinder 21. The poppet valve 14 is provided with a restricted orifice 23 communicating with the chamber 24 in the stem 22. This restricted orifice also communicates with the pressure responsive side 25 of the poppet valve 14 and the vent opening 13. A spring 26 abuts against the casing portion 20 of the frame 10 and valve head 15 and tends to force the poppet valve closed against the seat 17. A metering valve seat 27 is screw threadedly connected to the casing 20 concentrically thereof, and is adjustable axially of the poppet valve 14. A nut 28 screw threaded on the metering valve seat 27, abuts the casing 20, and provides an adjustment lock nut for the metering valve seat. The metering valve seat is provided with a cylindrical seat bore 29 in which a metering valve member 30 is reciprocally mounted. This metering valve member is tapered in a longitudinal direction, the taper being proportionally related to the compression rate of the spring 26. The head 32 of the metering valve member seats at the end of the bore 29 in the metering valve seat. A spring 33 disposed between the valve seat 27 and the valve member 30 tends to hold the metering valve member in closed position relative to the metering valve seat. Fixed to the stem 22 of the poppet valve member is a grate 34 engageable with the rounded end 35 of the metering valve member.

In the operation of the relief valve of Fig. 1 fluid pressure acts on the surface 25 of the poppet valve. When this pressure exceeds the pressure of the fluid on the opposite side of the poppet valve, the spring 26 is compressed and the seat 17 cleared. Pressure in the chamber 24 is initially equal to pressure on the surface 25 of the poppet valve. Such pressure equality is established by the orifice 23 as long as the poppet valve is in static condition.

When the poppet valve is opened by pressure acting on the surface 25 thereof, the grate 34 soon engages the metering valve 30 and progressively opens it in unison with the opening of the poppet valve. As the poppet valve opens, the compressive resistance of the spring 26 progressively increases. During further opening of the metering valve 30, pressure in the chamber 24 drops proportionately. This pressure drop in the chamber is caused by a larger amount of fluid venting through the metering valve than enters through the orifice 23. The resulting progressive pressure drop in the chamber 24 reduces the force tending to hold the poppet valve closed. Due to the taper of the metering valve 30 this progressive reduction of pressure in the chamber 24 is substantially equal and opposite to the progressively increasing compressive force of the spring 26 caused by opening of the poppet valve 14.

It is therefore obvious that the poppet valve 14 may be moved a considerable distance axially, for full capacity fluid flow, with very slight increase in the pressure required to initiate opening thereof. The tapered contour of the metering valve member 30 may be such that it will cause more rapid venting of the chamber 24 than hereinbefore described. Such an increase in the venting of the chamber could more than compensate for the compression rate of the spring 26, and thus the pressure required to hold the valve 14 open, might even be less than that required to initiate opening thereof. After the pressure in the vent opening 13 has been relieved by opening of the valve 14 it is automatically closed again by opposing pressure assisting the spring. Thus, when the pressure acting on the surface 25 is reduced, so that the pressure acting on the poppet valve outside the stem 22 is nearly equal thereto, the spring 26 closes the poppet valve on the seat 17 and the spring 33 closes the valve 31 relative to its seat 27.

It is possible to employ the relief valve of the invention as an actuator by simply making a mechanical connection with the poppet valve member 14, or its equivalent structure. Such actuators or valves, in accordance with this invention, may be moved through a considerable distance when employing an actuating fluid of very low pressure. The pneumatic compensation for the spring rate in accordance with this invention permits operation on a very narrow margin of pressure differential.

In the modification, as shown in Fig. 2 of the drawings, a flow valve 36 is pivotally mounted in a duct 37 and is operated by a remotely positioned actuator 38. This actuator 38 is operated by means of fluid pressure taken at a position in the duct 37 downstream from the valve 36. The fluid pressure is conducted from the duct 37, through a tube 39, to the actuator 38. The actuator is provided with a shaft 40 adapted to be connected with the valve 36, as shown in Fig. 2, or any other mechanism to be operated, as desired.

The shaft 40 extends into a casing 41, and is connected to a pressure responsive diaphragm 42 (Fig. 3) which is loaded by compressive force of a spring 43. The force of this spring 43 opposes pressure exerted on the diaphragm by fluid such as compressed air which enters the casing 41 through a port 44 in communication with the tube 39. A metering valve 45 is a cylindrical valve reciprocally mounted in a valve casing 46. This valve casing is sealed in the actuator casing 41 by means of a gasket 47 and a snap ring 48. At one end of the valve casing there is provided an ambient bleed orifice 49 which communicates with the metering valve 45. The metering valve is provided with a pressure responsive surface 50 which, at all times, is exposed to fluid pressure acting on the diaphragm 42. Interconnecting a diaphragm retainer 51 and the metering valve 45 is a universal joint member 52. This joint member provides for angular freedom of the diaphragm and shaft 40 relative to the rectilinear movement of the metering valve 45. One end of the joint member 52 is provided with an axially adjustable screw portion 53 threaded into the diaphragm retainer 51. A spring 54 interposed between the diaphragm retainer 51 and the metering valve 45, maintains the spherical portion 55 of the joint member seated against the engaging portion 56 of the metering valve member. The spring 54 thus assists the joint member in performing the functions, of maintaining a flexible connection, and of sealing the connection to prevent fluid leakage therethrough. The metering valve is provided with a helical row of bleed orifices 57 extending through its wall and arranged to be exposed to fluid pressure, at the end 58 of the metering valve cylinder, during axial movement of the metering valve toward the spring 43. When the bleed orifices 57, in the wall of the metering valve are exposed to a chamber 59, they provide air passages extending from the chamber 59 to the interior of the casing 46 and thence to bleed orifice 49.

The modified form of the invention, as shown in Figs. 2 and 3, operates as follows.

The device, as shown in Fig. 2, provides accurate and stable control of the flow of compressed air through the duct 37 in the direction indicated by the arrow.

The air pressure in the tube 39, downstream from the valve 36, is maintained at a predetermined value, by precise adjustment of the valve 36 through the actuator 38. Such adjustment is accomplished by air pressure acting on the diaphragm 42 of the actuator. When the air pressure in the tube 39 rises above a predetermined limit, the diaphragm 42 is subjected to pressure sufficient to overcome the force of the spring 43. During compression of the spring 43, due to the travel of the diaphragm 42, the metering valve 45 is retracted from the casing 46, causing successive exposure of the orifices 57 to the chamber 59. Compressed air now passes from the chamber 59 through these orifices into the chamber defined by the casing 46, thereby raising the pressure therein. Such pressure rise in the casing 46 is caused by admission of compressed air thereto, at a greater rate than it escapes through the orifice 49. Increased pressure in the casing 46 acts on the metering valve member 45, in opposition to pressure on the surface 50 thereof. Thus, the effective pressure on the metering valve 45, acting in the direction of the force of the spring 43, is reduced. Such pressure reduction is proportional to the movement of the spring 43.

As more of the orifices 57 are consecutively exposed to the chamber 59, they increase the flow of air into the chamber defined by the casing 46, raising the pressure therein, proportional to the progressively increasing force of the spring 43. Compensation for the spring rate permits the diaphragm 42, acted on by a given pressure, to deflect, and move the shaft 40 a considerable distance. Proportions of the compensating device and of the actuator diaphragm may be arranged so that the device operates smoothly, even when under the influence of very low pressures. The spring rate compensating means increases the stability of control because a large amplitude of deflection of the spring may be accomplished when opposed by a fixed pressure.

Figure 4:
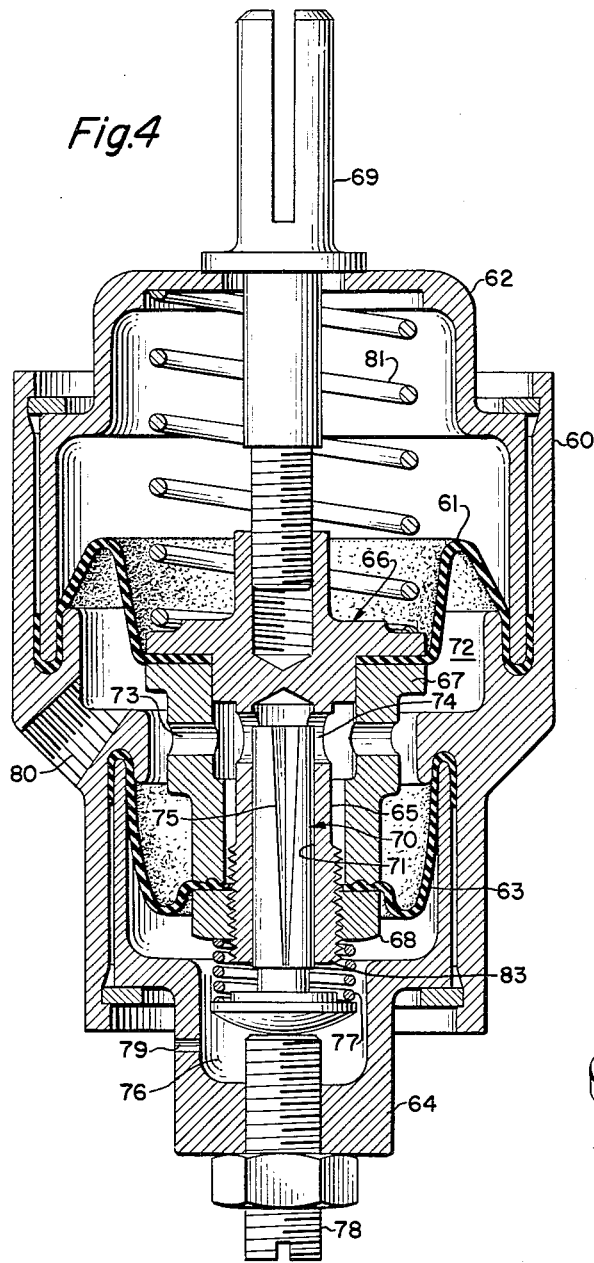
Fig. 4 is an axial sectional view of a modified actuator embodying the invention.
Figure 5:
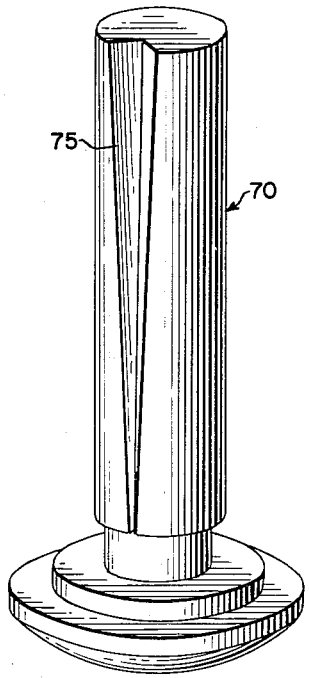
Fig. 5 is a perspective view of the metering valve of the actuator shown in Fig. 4.

The modified actuator shown in Fig. 4 is provided with a casing 60 wherein a flexible diaphragm 61 is secured at its periphery by a casing cap 62. The inlet port 80 of the casing 60 communicates with a source of compressed air. A diaphragm 63 is secured at its periphery to the interior of the casing 60, by means of an end cap 64. The effective area of the diaphragm 61 is greater than that of the diaphragm 63. The central portions of the diaphragms 61 and 63 are secured to the shank 65 of a clamp plate 66 by means of a spacer 67 and a screw threaded nut 68. An actuator shaft 69 is screw threadedly connected to the clamp plate 66, and may engage an object to be actuated, for example, a control valve. A metering valve 70 is reciprocally mounted in a bore 71 of the clamp plate shank 65. This metering valve 70 communicates with a chamber 72, through openings 73 and 74 in the spacer 67 and in the stem 65 respectively. The metering valve is provided with a longitudinally tapered channel 75, adapted to conduct air from the chamber 72 to a chamber 76. The chamber is disposed on the side of the diaphragm 63 opposite from the chamber 72. The open end 83 of the shank 65 communicates with the chamber 76, and in co-operation with the tapered channel 75 provides variation of fluid flow through the metering valve 70. A spring 77 tends to retract the metering valve 70 from the open end 83 of the bore 71. An adjustable stop screw 78, screw threaded in the end of the cap 64, maintains initial setting of the metering valve 70. An ambient bleed orifice 79 communicates with chamber 76 and the valve 70. The channel 75 communicates chamber 72 and the port 80 with a source of compressed air. The compressed air in the chamber 72 acts on the diaphragm 61 in opposition to the force of a spring 81. This spring 81 is supported by the casing cap 62 and engages the clamp plate 66.

In operation, compressed air enters the port 80 and the chamber 72, wherein it acts on the diaphragms 61 and 63. The difference in areas of the diaphragms entails a resultant force tending to compress the spring 81. When the pressure in the chamber 72 reaches a predetermined value, the spring 81 is compressed and the diaphragms, together with the shank 65, move toward the casing cap 62.

As the end 83 of the shank 65 moves with respect to the metering valve 70, the tapered channel 75 is progressively exposed to the chamber 76, whereby volume flow of fluid therethrough increases proportionally. The flow of air through the openings 73 and 74 is conveyed by the channel 75, to the chamber 76. The taper of the channel 75 is proportional to the progressively increasing force of the spring 81 as it deflects. During increasing deflection of the spring 81 the metering valve vents an increasing flow of air from the chamber 72 into the chamber 76. The pressure in the chamber 76 is gradually increased due to the fact that the size of the vent 79 is fixed, while the capacity of the metering valve 70 increases. The pressure rise in the chamber 76 reduces the effective pressure on the diaphragm 63 which normally acts in favor of the spring 81. The progressive reduction of effective pressure on the diaphragm 63 compensates for the correspondingly increasing force of the spring. Compensation for the increasing force of the spring permits pressure of a predetermined magnitude to deflect the spring a considerable distance after overcoming the initial preload thereof.

I claim:

1. A relief valve comprising: a main valve having a first surface portion responsive to pressure tending to open said main valve, resilient means tending to close said main valve, expansible chamber means having a second surface portion responsive to pressure tending to close said main valve, said first surface portion having an area greater than that of said second surface portion, restricted passage means communicating with said first surface portion and said chamber means, and a metering valve having an open position flow area which is greater than that of said restricted passage means, said metering valve communicating with said chamber means and a region of lower pressure and being opened by said main valve during opening movement of said main valve, whereby said chamber means is progressively vented to said region of lower pressure in accordance with increasing resistance of said resilient means to the opening movement of said main valve.

2. An actuator comprising: a movable member having a surface portion responsive to pressure tending to shift said movable member in one direction, resilient means tending to shift said movable member in the opposite direction, pressure responsive means having a surface portion responsive to pressure tending to assist shifting said movable member in said opposite direction, said first mentioned surface portion having an area greater than that of the second mentioned surface portion, restricted passage means communicating with both of said surface portions, and a metering valve having an open position flow area which is greater than that of said restricted passage means, said metering valve communicating with the means having the second mentioned surface portion and a region of lower pressure and being operated by said movable member during opening movement of the latter.

3. A valve comprising: a frame, a main valve seat on said frame, a main valve member engageable with said seat, one side of said valve member having a surface responsive to pressure tending to open said valve, a spring tending to close said valve member on said seat, expansible chamber means having a surface responsive to pressure tending to close said valve, said second mentioned surface having a smaller pressure responsive area than that of said first mentioned surface, restricted passage means communicating with both of said surfaces, and a metering valve communicating with said chamber and a region of lower pressure and operated by said valve member during opening movement of the latter, whereby opening of said valve member in response to pressure on said one side thereof progressively opens said metering valve for venting said chamber to said region of lower pressure, thereby reducing the pressure in said chamber proportionally to increasing compression resistance of said spring.

4. A relief valve comprising: a frame, a valve seat on said frame, a poppet valve having a pressure responsive side engaging said seat, a spring tending to hold said poppet valve closed on said seat, means on the opposite side of said poppet valve including an expansible pressure chamber of lesser area than the area surrounded by said seat and carried by said poppet valve, orifice means intercommunicating with said chamber and said pressure responsive side of said poppet valve, a metering valve having open position flow capacity greater than that of said orifice means, said metering valve being supported on said frame and communicating with said chamber and with a region of lower pressure, and means for opening said metering valve in co-operation with opening movement of said poppet valve.

5. A relief valve comprising: a frame housing having a bore therethrough, a valve seat on said frame and concentric with said bore, a poppet valve having a pressure responsive side engaging said seat, a spring tending to hold said poppet valve closed on said seat, said poppet valve having a pressure rseponsive element reciprocally mounted in said bore whose area is smaller than the area surrounded by said seat, orifice means intercommunicating with said bore and a chamber on said pressure responsive side of said poppet valve, a metering valve having open position flow capacity greater than that of said orifice means, said metering valve being supported on said frame and communicating with said bore and a region of lower pressure and means operably associated with said poppet valve and engageable with said metering valve for opening said metering valve in co-operation with the opening movement of said poppet valve.

6. A relief valve comprising: a movable member controlling fluid flow through said valve, means arranged to subject said movable member to fluid pressure, a spring tending to resist movement of said movable member in response to said fluid pressure, pressure responsive means communicating with said fluid pressure and arranged to act in the same direction as said spring, means for subjecting said pressure responsive means to said fluid pressure, a valve arranged to be operated by said movable member and communicating with said pressure responsive means and a region of lower pressure, whereby fluid pressure on said pressure responsive means may be varied by operation of said valve to compensate for the compressive force of said spring when deflected by said movable member.

7. An actuator comprising: a movable member having a first surface portion responsive to pressure to shift said movable member in one direction and a second surface portion of smaller area than the first and responsive to pressure to tend to resist the shifting of said movable member in said one direction; said second surface portion forming a wall portion of expansible chamber means; resilient means tending to resist the shifting of said movable member in said one direction; means forming a first passage establishing restricted communication between said surface portions and a second passage establishing relatively unrestricted communication between said second surface portion and a region of low pressure; and a metering valve disposed to normally close said second passage and to be moved toward open position by said movable member upon movement thereof in said one direction, said metering valve being shaped to progressively increase the effective opening of said second passage upon movement by said movable member in proportion to the increase in resistance of said resilient means upon movement of said movable member.

8. A fluid pressure operated actuator comprising: a member supported for reciprocatory movement; resilient means tending to urge said member in one direction, said member having a first surface area responsive to fluid pressure to move said member in opposition to said resilient means, such movement tending to increase the force of said resilient means, means on said member to compensate for the increase in force of said resilient means, said compensating means having surface areas exposed to fluid pressure in the initial position of said member the resultant force of which tends to urge said member in said one direction; and metering valve means disposed to control the application of fluid pressure to a predetermined portion of said surface areas of said compensating means, said valve means being located to be actuated by said member to a position to vary the pressure applied to the predetermined portion of said surface areas of said compensating means in proportion to the increase in force of said resilient means to decrease the tendency thereof to urge said member in said one direction whereby the response of the first surface area to fluid pressure to move said member in opposition to said resilient means will be increased.

9. A fluid pressure operated actuator comprising: a member supported for reciprocatory movement; resilient means tending to urge said member in one direction, said member having a diaphragm responsive to fluid pressure to move said member in opposition to said resilient means, such movement tending to increase the force of said resilient means; means on said member to compensate for the increase in force of said resilient means, said compensating means having a surface area exposed to the same pressure applied to said diaphragm and being responsive to such pressure to tend to urge said member in the same direction as said resilient means, said compensating means having additional surface area opposed to the first-mentioned surface area; means forming a passage for applying fluid pressure to said additional surface area; and valve means responsive to movement of said member to control fluid flow through said passage, predetermined movement of said member causing said valve to increase the flow through said passage in proportion to the increase in force of said resilient means whereby the force exerted by said compensating means in said one direction will be diminished and the force tending to move said member in opposition to said resilient means will be increased.

10. A fluid pressure operated actuator comprising: a member supported for reciprocatory movement; resilient means tending to urge said member in one direction; said member having a diaphragm responsive to fluid pressure to move said member in opposition to said resilient means, such movement tending to increase the force of said resilient means; means operative to compensate for the increase in force of said resilient means, said compensating means having a cylinder and a piston, the latter being in motion transmitting relationship with said member and responsive to the same pressure applied to said diaphragm to tend to urge said member in the same direction as said resilient means; means forming a passage for applying fluid pressure to said piston to oppose movement of said member by said resilient means; and valve means responsive to movement of said member to control fluid flow through said passage, predetermined movement of said member causing said valve to increase the flow through said passage in proportion to the increase in force of said resilient means whereby the force exerted by said piston in said one direction will be diminished and the force tending to move said member in opposition to said resilient means will be increased.

11. A fluid pressure operated actuator comprising: a member supported for reciprocatory movement; resilient means tending to urge said member in one direction, said member having a diaphragm responsive to fluid pressure to move said member in opposition to said resilient means, such movement tending to increase the force of said resilient means; means operative to compensate for the increase in force of said resilient means, said compensating means having a second diaphragm in motion transmitting relationship with said member and responsive to the same pressure applied to the first-mentioned diaphragm to tend to urge said member in the same direction as said resilient means; means forming a passage for applying fluid pressure to said second diaphragm to oppose movement of said member by said resilient means; and valve means responsive to movement of said member to control fluid flow through said passage, predetermined movement of said member causing said valve to increase the flow through said passage in proportion to the increase in force of said resilient means until the force exerted by said second diaphragm in said one direction is diminished and the force tending to move said member in opposition to said resilient means is increased.

References Cited in the file of this patent

UNITED STATES PATENTS

| Number | Name | Date |
|---|---|---|
| 781,913 | Schutte | Feb. 7, 1905 |
| 1,056,562 | Lombard | Mar. 18, 1913 |
| 1,949,150 | Eklett | Feb. 27, 1934 |
| 1,972,435 | Ackermann | Sept. 4, 1934 |
| 2,191,076 | Jacovelli | Feb. 20, 1940 |